3,368,974
PYRENYL COMPOUNDS AND USE THEREOF
Allen K. Sparks, Des Plaines, Ill., assignor to Universal Oil Products Company, Des Plaines, Ill., a corporation of Delaware
No Drawing. Continuation-in-part of application Ser. No. 422,402, Dec. 30, 1964. This application May 16, 1967, Ser. No. 638,715
12 Claims. (Cl. 252—50)

ABSTRACT OF THE DISCLOSURE

Novel pyrenyl compounds of the formula:

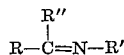

where R and R' are pyrenyl or non-pyrenyl aryl with at least one thereof being pyrenyl, and R'' is selected from hydrogen and hydrocarbyl. These compounds are particularly useful as additives to organic substances which deteriorate due to oxidation and/or ultraviolet absorption.

CROSS-REFERENCE TO RELATED APPLICATIONS

This is a continuation-in-part of application Ser. No. 422,402, now abandoned, filed Dec. 30, 1964.

DESCRIPTION OF THE INVENTION

The novel compounds of the present invention are illustrated by the following general formula:

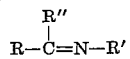

where R and R' are selected from pyrenyl and non-pyrenyl aryl with at least one thereof being pyrenyl, and R'' is selected from hydrogen and hydrocarbyl.

When R is pyrenyl and R' is non-pyrenyl aryl, the compounds of the present invention may be illustrated by the following formula and, in one embodiment, may be named as N-aryl-pyrenylalkylimine.

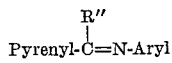

When R' is pyrenyl and R is non-pyrenyl aryl, the novel compounds may be represented by the following formula and, in one embodiment, may be named as N-aralkyl-pyrenylamine.

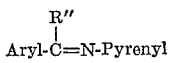

In a preferred embodiment, the novel compound of the present invention is an N-salicylal-1-pyrenylamine which also may be named N-salicylal-3-pyrenylamine. Another preferred compound is N-benzal-1-pyrenylamine.

It is understood that the salicylal ring, the benzal ring and/or one or more of the pyrenyl rings may contain substitutents attached thereto. The substituents preferably are hydrocarbyl and are selected from alkyl, including particularly methyl, ethyl, propyl, butyl, pentyl, hexyl, heptyl, octyl, etc., aryl including phenyl, naphthyl, anthracyl, etc., alkaryl including toluene, xylene, ethylphenyl, propylphenyl, butylphenyl, methylethylphenyl, methylpropylphenyl, methylbutylphenyl, diethylphenyl, ethylpropylphenyl, ethylbutylphenyl, dipropylphenyl, propylbutylphenyl, etc., cycloalkyl, including cyclobutyl, cyclopentyl, cyclohexyl, cycloheptyl, cyclooctyl, etc., aralkyl, including benzyl, phenylethyl, phenylpropyl, phenylbutyl, etc., hydroxy, alkoxy including methoxy, ethoxy, propoxy, butoxy, etc., and mixtures thereof.

In another embodiment the preferred compounds are N-aryl-pyrenylalkylimines. A particularly preferred compound in this embodiment is N-phenyl-pyrenylmethylimine. Another preferred compound is N-naphthyl-pyrenylmethylimine. Here again, it is understood that the pyrenyl, phenyl and/or naphthyl rings may contain substituents attached thereto. The substituents preferably are selected from those hereinbefore specifically set forth.

The compounds of the present invention are prepared in any suitable manner. In one embodiment the compounds are prepared by the reaction of a pyrenylamine with an aryl aldehyde. In another embodiment the compounds of the present invention are prepared by the reaction of a suitable oxygen-containing derivative of a pyrenyl compound with an arylamine. As hereinbefore set forth, such compounds may be named N-aryl-pyrenyl-alkylimine. For example, pyrenylaldehyde is reacted with aniline to prepare N-phenyl-pyrenylmethylimine. In place of pyrenylaldehyde an acyl derivative of pyrene is reacted with the arylamine and the product will be of the general formula hereinbefore set forth where R'' is a hydrocarbon substituent. Illustrative acyl derivatives of the pyrenyl compound include acetyl, propionyl, butyryl, valeryl, caproyl, capryl, stearoyl, etc., in which case R'' in the above formula is alkyl, or the acyl derivative may be benzoyl in which case R'' in the above formula is aryl. Here again, it is understood that the arylamine and/or one or more rings of the pyrenyl compound may contain one or more substituents attached thereto, the substituents preferably being selected from those hereinbefore set forth. In this modification a particularly preferred additive is prepared by the reaction of acetyl pyrene with 3,5-di-butyl-4-hydroxy aniline which also may be named 2,6-di-butyl-p-aminophenol.

The compounds of the present invention are prepared in any suitable manner. As hereinbefore set forth, in one embodiment these compounds are prepared by reacting pyrenyl amine with an aromatic aldehyde. This reaction is readily effected by refluxing a mixture of the amine and the aldehyde, preferably in the presence of a suitable solvent, and collecting the water liberated during the reaction. The preferred solvents are aromatic hydrocarbons and include particularly benzene and toluene. Other aromatic hydrocarbons comprise xylene, ethylbenzene, cumene, etc. Other solvents include paraffins and particularly hexane, heptane, octane, nonane, decane, etc. Also, as hereinbefore set forth, the compounds of the present invention may be prepared by reacting a suitable oxygen-containing derivative of the pyrenyl compound with an arylamine. This reaction is effected by refluxing a mixture of the reactants in the presence of a suitable solvent as hereinbefore described. Following completion of the reaction, the solvent is removed by distillation under vacuum and the desired product is recovered as a solid residue or as an oil which subsequently will crystallize. When desired, the crude product may be purified by recrystallization from a suitable solvent including benzene, toluene, hexane, heptane, etc., or mixtures thereof.

As hereinbefore set forth, the product generally is recovered as a solid and may be utilized as such or dissolved in a suitable solvent. Any suitable solvent may be used and will be one which will be satisfactory for use in the organic substance to be stabilized. Thus, for example, when the organic substance is a hydrocarbon, the solvent may comprise an aromatic hydrocarbon including benzene, toluene, xylene, cumene, etc., or mixtures thereof.

The novel compound of the present invention is particularly useful as an additive to prevent deterioration of an organic substance during transportation, storage and/or use. In most organic substances the deterioration is due primarily to oxidation reactions. In other organic substances as, for example, plastics, deterioration also is caused by U.V. absorption. Regardless of the source thereof, deterioration of the organic substance is retarded and/or prevented by the novel method of the present invention.

Stabilization of the organic substances is accomplished by incorporating therein the novel compound of the present invention. In one embodiment, the organic substance is a plastic and particularly polyolefin, including polyethylene, polypropylene, polybutylene, mixed ethylene-propylene polymers, mixed ethylene-butylene polymers, mixed ethylene-propylene-butylene polymers, etc. The solid olefin polymers are used in many applications including electrical insulation, lightweight outdoor furniture, awnings, fibers, etc. Another plastic is polystyrene, which is particularly useful in the manufacture of molded or machined articles. Still another class of plastics is vinyl resins which are derived from monomers such as vinyl chloride, vinyl acetate, vinylidine chloride, etc., such plastics including polyvinyl chloride, copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof. Still other plastics include polycarbonates, phenolformaldehyde resins, urea-formaldehyde resins, melamineformaldehyde resins, acryloid plastics, polyacetals, linear or cross-linked polyesters, etc. Still other plastics are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc.

As hereinbefore set forth, deterioration of the plastics occurs due to oxidation and/or U.V. absorption. In many uses, the plastics are exposed to sunlight and air for extended periods of time and undergo deterioration during such exposure.

Another organic substance which undergoes deterioration due to oxidation is rubber, which may be synthetically prepared or naturally occurring. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, caoutchouc, balata, gutta percha, etc.

Still other organic substances which undergo deterioration due to oxidation include hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. Still other organic substances include synthetic oils, as, for example, synthetic lubricating oils, which comprise one or a mixture of aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides and derivatives include polyisopropylene oxide, polyisopropylene oxide diether, polyisopropylene oxide diester, etc. The silicones include methyl silicones, methylphenyl silicones, etc., and the silicates include, for example, tetraisooctyl silicate, diphenyl di-n-dodecyl silane, octadecyl tri-n-decyl silane, polysilylmethylenes, various silane mixtures, silicone-ester blends, etc. The highly fluorinated hydrocarbons include fluorinated oil, perfluorohydrocarbons, etc.

Additional synthetic lubricating oils include (1) neopentyl glycol esters in which the ester group contains from three to twelve carbon atoms or more, and particularly neopentyl glycol propionates, neopentyl glycol butyrates, neopentyl glycol caproates, neoptntyl glycol caprylates, neopentyl glycol pelargonates, etc., (2) trimethylol alkanes, such as trimetylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particuarly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

In one method greases are prepared by compositing metallic soaps with lubricating oils, which oils may be of petroleum origin or synthetically prepared, and are classified as lithium base grease, sodium base grease, strontium base grease, aluminum base grease, barium complex grease, calcium complex grease, sodium-calcium grease, calcium-lead grease, etc. The grease also may contain thickening agents such as silica, carbon black, talc, organic modified Bentonite, etc., polyacrylates, amides, polyamides, aluminum imides, phthalocyanines, oxanilides, complex aromatic imides and amides, hydantoin derivatives, benzidine dyes, aryl ureas, methyl N-n-octadecyl terephthalamate, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The above are illustrative examples of organic substances which undergo deterioration due to oxygen, U.V. absorption, etc. It is understood that the novel process of the present invention also may be used with other organic substances which undergo such deterioration.

The additive of the present invention is incorporated in the organic substance in a concentration sufficient to effect the desired stabilization. The specific concentration will depend upon the particular organic substance being stabilized and thus the concentration may be within the range of from about 0.001% to about 25% by weight of the organic substance. In most cases, however, the concentration will be within the range of from about 0.01% to about 5% by weight of the organic substance.

In many applications it may be advantageous to utilize the additive of the present invention in conjunction with other additives. For example, in the stabilization of plastics, a phenolic antioxidant, particularly 2,6-ditertbutyl - 4 - methyl phenol or 2,4 - dimethyl - 6 - tertiarybutyl phenol may be used. Other phenolic inhibitors or amino type inhibitors also may be used. When used in rubber, it also is desirable to incorporate an antiozonant in the rubber, preferred antiozants being N,N'-di-secoctyl - p - phenylenediamine, N - phenyl - N' - isopropylp - phenylenediamine, N - phenyl - N' - sec - octyl - p-phenylenediamine, etc.

The additive of the present invention is incorporated in the organic substance in any suitable manner and, when desired, may be admixed with the other additives and the mixture added to the organic substance in one step. When the additive or mixture is to be incorporated into a plastic, resin or the like, it may be added to the hot melt, with stirring, generally in a Banbury mixer, extruder or other device. Incorporation of the additive in a liquid preferably is accompanied by intimate mixing to effect distribution of the additive throughout the liquid. When the additive is added to a multicomponent mixture as, for example, grease, it may be added to one of the components and, in this manner, incorporated into the final mixture or it may be added directly into the final mix.

As hereinbefore set forth the compounds of the present invention, illustrated by the formulas hereinbefore set forth, comprises two general subgeneric classes of compounds. The two subgeneric classes are illustrated by the following formulas which describe compounds formed by the reaction of a pyrenylamine with salicylaldehyde in one case, and a pyrenyl compound with 2,6-di-tert-butyl-p-amino phenol in the other case. It is understood that these formulas are illustrative only and that corresponding type compounds are prepared from different reactants.

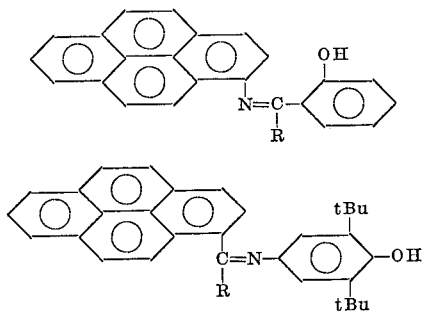

The following examples are introduced to illustrate further the novelty and utility of the present invention but not with the intention of unduly limiting the same.

Example I

The compound of this example is N-salicylal-1-pyrenylamine which also may be named N-salicylal-3-pyrenylamine. This compound was prepared by charging 21.7 g. (0.10 mole) of 1-aminopyrene, 12.29 (0.10 mole) of salicylaldehyde and 200 cc. of benzene into a 1 liter flask fitted with a Dean-Stark tube and reflux condenser. The mixture was heated and refluxed for a period of 3.5 hours, during which time 1.5 cc. of water was collected. Following completion of the reaction, the benzene was removed by vacuum distillation to leave a solid residue. The solid residue was recrystallized from a mixture of benzene and hexane. N-salicylal-1-pyrenylamine was recovered as yellow-green crystals in a yield of 20.5 g., melting point of 138–140° C. Calculated for $C_{23}H_{15}NO$: N, 4.37%. Found: N, 4.65%.

Example II

The compound of this example is N-benzal-1-pyrenylamine and was prepared by heating and refluxing a mixture of 13 g. (0.06 mole) of 1-amino pyrene and 8.5 g. (0.08 mole) of benzaldehyde in 200 cc. of toluene. The water collected during the reaction amounted to 0.9 cc. which is only slightly less than the theoretical amount of 1.1 cc. of water. Following completion of the reaction, the product was recrystallized from hexane. N-benzal-1-pyrenylamine was recovered in a yield of 14 g. which corresponds to a yield of 76%, melting point of 120–122° C. Calculated for $C_{23}H_{15}N$: N, 4.59%. Found: N, 434%.

Example III

N-(3,5-di-ter-butyl-4 - hydroxy-1 - pyrenylethylimine is prepared by refluxing equal molar proportions of 3,5-di-tert-butyl-4-hydroxy aniline and acetal pyrene in the presence of benzene solvent. The water of reaction is collected in substantially the theoretical amount. Following completion of the reaction, the benzene solvent is removed by vacuum distillation and N-(3,5-di-tert-butyl-4-hydroxy)-1-pyrenylethylimine is recovered and purified by recrystallization from hexane.

Example IV

The compound of this example is N-phenyl-pyrenylmethylimine and was prepared by the reaction of pyrenealdehyde with aniline. The pyrenealdehyde was prepared by first supplying 101 g. (0.5 mole) of pyrene, 147 g. (1 mole) of ortho-dichlorobenzene and 135 g. (1 mole) of N-methylformanilide to a one liter three-neck flask equipped with stirring means. The mixture was stirred, heated to 90–95° C. and 153 g. (1 mole) of phosphorus oxychloride was gradually added thereto over a period of 45 minutes, following which the mixture was stirred and maintained at 95° C. for an additional 2 hours. The color of the mixture turned from yellow to red-black and finally to a gray-black solid. The solid was recrystallized to yield yellow needles having a melting point of 125.5–126° C., which corresponds to the literature value for pyrenealdehyde of 126° C.

The pyrenealdehyde, prepared in the above manner, was reacted with aniline by mixing 4.8 g. (0.02 mole) of the pyrenealdehyde, 1.86 g. (0.02 mole) of aniline with 50 cc. of benzene. The mixture was refluxed at the boiling point of benzene for 12 hours. After completion of reaction, 4.17 g. of N-phenyl-pyrenylmethylimine was recovered as a yellow-brown solid.

Example V

As hereinbefore set forth, the compounds of the present invention are particularly useful as additives in polyolefins to prevent deterioration due to oxygen and/or U.V. absorption. The present example reports evaluations made in a solid polypropylene. The solid polypropylene without inhibitor was stated to have properties substantially as follows:

TABLE I

| | |
|---|---|
| Specific gravity | 0.910–0.920 |
| Refractive index, $n_D^{25}$ | 1.510 |
| Heat distortion temperature: | |
| At 66 p.s.i. load | 116° C. |
| At 264 p.s.i. load | 66° C. |
| Tensile yield strength, p.s.i.: | |
| (ASTM D–638–58T), (0.2″ per min.) | 4700 |
| Total elongation, percent | 300–400 |
| Stiffness flexural: | |
| (ASTM D747–50) | 1.8 |
| Shore hardness: | |
| (ASTM D676–55T) | 74D |

The additives when employed were incorporated into the different samples of the polypropylene by milling. The different samples of the polypropylene were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm. Hg.

When evaluated in the above manner, a control sample of the polypropylene without additive, had an Induction Period of less than 48 hours. In contrast, a sample of the polypropylene containing 0.15% by weight of N-salicylal-1-pyrenylamine, prepared as described in Example I, had an Induction Period of about 430 hours.

Example VI

Another sample of the polypropylene described in Example V was prepared to contain 0.15% by weight of N-benzal-1-pyrenylamine, prepared as described in Example II. When evaluated in the same manner as described in Example V, the sample of the polypropylene containing this additive increased the Induction Period from less than 48 hours for the control sample to about 429 hours.

Example VII

This example illustrates the improvement obtained by the novel additive of the present invention containing the pyrenyl structure as compared to a similar compound containing only mononuclear configuration. When 1% by weight of N-salicylal-1-pyrenylamine, prepared as described in Example I, was incorporated in another sample of the polypropylene described in Example V and evaluated in the same manner, the Induction Period of the polypropylene was increased to 2560 hours. For comparative purposes, N-salicylal aniline was incorporated in a concentration of 1% by weight into another sample of the polypropylene and, when evaluated in the same manner, the Induction Period was increased to only 214 hours. From these data, it will be seen that the additive of the present invention was more than 10 times as effective as the additive not containing the pyrenyl configuration.

Example VIII

Samples of the polypropylene described in Example V, with and without additive, were exposed outdoors and the physical properties were determined in an Instron Universal tester. The polypropylene samples were cut into dumb-bell specimens (3.876" long and 0.625" wide with the neck being 0.876" long, 0.312" wide and 0.017" thick). In the Instron Universal tester, the dumb-bell specimen is gripped firmly at the top and bottom. A constant pull of 2" per minute is exerted downwardly and the following data were obtained: (1) The percent elongation until rupture occurs and (2) the yield strength, which is the point at which the sample loses its resistance to permanent deformation. In most cases, the yield strength is equivalent to the tensile strength which is the pounds per square inch of force at which rupture occurs.

The following table reports the results of such evaluations for (1) a sample of the polypropylene without additive and (2) a sample of the polypropylene containing 1% by weight of N-salicylal-1-pyrenylamine, prepared as described in Example I. In addition the table reports the initial physical properties of the polypropylene.

TABLE II

| Additive | Initial Physical Properties | | After Exposure Outdoors | | |
|---|---|---|---|---|---|
| | Elongation, percent | Yield Strength, p.s.i. | Days | Elongation, percent | Yield Strength, p.s.i. |
| None | 420 | 4,700 | 8 | 3.6 | 1,664 |
| N-salicylal-1-pyrenylamine | 420 | 4,700 | 74 | 280 | 4,500 |

From the data in the above table, it will be seen that the control sample (not containing the additive) lost practically all of its desirable physical properties after about eight days of outdoor exposure. In contrast, the sample of polypropylene containing the additive of the present invention still retained a considerable portion of these desired physical properties after 74 days of outdoor exposure.

Example IX

N-phenyl-pyrenylmethylimine, prepared as described in Example IV was evaluated in another solid polypropylene. The solid polypropylene used in this example had an initial yield strength of 4600 p.s.i., which after 96 hours of exposure in a fadeometer decreased to 480 p.s.i.g. In contrast, another sample of the solid polypropylene containing 0.5% by weight of N-phenyl-pyrenylmethylimine had a yield strength of 4360 p.s.i. after 144 hours of exposure and still had a yield strength of 2390 p.s.i. after 624 hours of exposure.

Example X

N-phenyl-pyrenylmethylimine prepared as described in Example IV also was evaluated in another sample of solid polypropylene by the oxidation method described in Example V. A control sample of the polypropylene without additive had an Induction Period of four hours. In contrast, a sample of the polypropylene containing 0.5% by weight of N-phenyl-pyrenylmethylimine had an Induction Period of 1140 hours.

Example XI

The plastic of this example is solid polyethylene of the high density type. An inhibited product of this polyethylene is marketed commercially under the trade name of "Fortiflex." A batch of this polyethylene free of inhibitor is pressed into sheets of about 17 mil. thickness and cut into plaques of about 1⅜" x 1½". When employed, the additive is incorporated in the polyethylene prior to pressing into sheets. The different samples are evaluated in the weatherometer. The plaques are inserted into plastic holders, affixed onto a rotating drum and exposed to carbon arc rays at about 52° C. in the weatherometer. The samples are examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and accordingly increased deterioration.

A sample of the polyethylene without inhibitor when evaluated in the weatherometer increases from a carbonyl number of 28 to a carbonyl number of 855 within 624 hours. In contrast, another sample of the polyethylene containing 1% by weight of N-salicylal-1-pyrenylamine, prepared as described in Example I, does not develop a carbonyl number of 1000 for a considerably longer period of time.

Example XII

N-benzal-1-pyrenylamine, prepared as described in Example II, is used as an inhibitor in polystyrene. The inhibitor is incorporated in a concentration of 1% by weight by partly melting the polystyrene and adding the inhibitor to the hot melt. The polystyrene containing the inhibitor is of improved resistance to deterioration by ultraviolet light.

Example XIII

N-naphthyl-pyrenylmethylimine is used as an additive in grease. The additive is incorporated in a concentration of 0.3% by weight in a commercial Mid-Continent lubricating oil having an S.A.E. viscosity of 20. Approximately 92% of the lubricating oil then is mixed with approximately 8% by weight of the lithium stearate. The mixture is heated to about 230° C., with constant agitation. Subsequently the grease is cooled, while agitating, to approximately 120° C., and then the grease is further cooled slowly to room temperature.

The stability of the grease is tested in accordance with ASTM D-942 method, in which method, a sample of the grease is placed in a bomb and maintained at a temperature of 121° C. Oxygen is charged to the bomb, and the time required for a drop of five pounds pressure is taken as the Induction Period. A sample of the grease without additive will reach the Induction Period within 4 hours. A sample of the grease containing 0.3% by weight of N-naphthyl-pyrenylmethylimine will not reach the Induction Period until more than 100 hours, when evaluated in the above manner.

*Example XIV*

N-salicylal-1-pyrenylamine, prepared as described in Example I, is utilized as an additive in synthetic lubricating oil. The synthetic lubricating oil is dioctyl sebacate and is marketed under the trade name of "Plexol." The additive is incorporated in a concentration of 1% by weight in the synthetic lubricating oil with intimate mixing. This serves to prevent oxidative deterioration of the lubricating oil.

*Example XV*

N-benzal-pyrenylamine, prepared as described in Example II, is used in a concentration of 0.5% by weight in fuel oil and serves to retard sediment formation therein.

I claim as my invention:

1. A pyrenyl compound of the formula

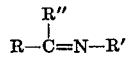

where R and R' are pyrenyl or non-pyrenyl aryl with at least one thereof being pyrenyl, and R" is selected from hydrogen and hydrocarbyl.

2. The compound of claim 1 being N-aryl-pyrenylalkylimine.

3. The compound of claim 2 being N-phenyl-pyrenylmethylimine.

4. The compound of claim 1 being N-aralkyl-pyrenylamine.

5. The compound of claim 4 being N-salicylal-pyrenylamine.

6. The compound of claim 4 being N-benzal-pyrenylamine.

7. The compound of claim 1 used in a stabilizing concentration to retard deterioration of an organic substance.

8. The compound of claim 7 in which said organic substance is organic plastic polymer.

9. The compound of claim 8 in which said polymer is solid polyolefin.

10. The compound of claim 7 in which said organic substance is a hydrocarbon distillate.

11. The compound of claim 10 in which said hydrocarbon distillate is fuel oil.

12. The compound of claim 7 in which said organic substance is grease.

References Cited

UNITED STATES PATENTS

| | | | |
|---|---|---|---|
| 2,376,354 | 5/1945 | Gresham | 260—45.9 |
| 2,641,538 | 6/1953 | Thompson et al. | 44—73 |
| 2,886,601 | 5/1959 | Clough | 260—570.6 |
| 2,951,832 | 9/1960 | Moran | 260—566 |
| 3,041,165 | 6/1962 | Sus et al. | 260—566 |
| 3,055,815 | 9/1962 | Lyons | 260—566 |
| 3,201,350 | 8/1965 | McHugh et al. | 252—50 |
| 3,208,859 | 9/1965 | Coffield | 252—401 |
| 3,240,706 | 3/1966 | Cyba et al. | 260—45.9 |
| 3,249,582 | 5/1966 | Schmidt et al. | 260—45.9 |
| 3,255,191 | 6/1966 | Dexter et al. | 44—73 |

DANIEL E. WYMAN, *Primary Examiner.*

I. VAUGHN, *Assistant Examiner.*